United States Patent
Chang

(10) Patent No.: US 11,137,086 B2
(45) Date of Patent: Oct. 5, 2021

(54) SOLENOID VALVE AND MANUFACTURING METHOD FOR THE SAME

(71) Applicant: Jui-Pin Chang, Taipei (TW)

(72) Inventor: Jui-Pin Chang, Taipei (TW)

(*) Notice: Subject to any disclaimer, the term of this patent is extended or adjusted under 35 U.S.C. 154(b) by 59 days.

(21) Appl. No.: 16/694,561

(22) Filed: Nov. 25, 2019

(65) Prior Publication Data
US 2020/0191296 A1 Jun. 18, 2020

(30) Foreign Application Priority Data
Dec. 12, 2018 (TW) .................. 107144824

(51) Int. Cl.
| | | |
|---|---|---|
| *F16K 31/06* | (2006.01) | |
| *H01F 7/127* | (2006.01) | |
| *H01F 7/08* | (2006.01) | |
| *H01F 7/06* | (2006.01) | |

(52) U.S. Cl.
CPC ......... *F16K 31/0658* (2013.01); *H01F 7/081* (2013.01); *H01F 7/127* (2013.01); *H01F 2007/062* (2013.01)

(58) Field of Classification Search
CPC .............. F16K 27/0263; F16K 27/029; F16K 31/0627; H01F 7/127; H01F 2007/083
USPC .................. 137/625.67, 625.69; 251/129.15
See application file for complete search history.

(56) References Cited

U.S. PATENT DOCUMENTS

| | | | | |
|---|---|---|---|---|
| 4,074,700 | A * | 2/1978 | Engle | F16K 31/0627 137/625.27 |
| 5,027,846 | A * | 7/1991 | Baron | F16K 31/0606 137/82 |
| 5,535,783 | A * | 7/1996 | Asou | F16K 31/0693 137/625.65 |
| 7,004,450 | B2 * | 2/2006 | Yoshimura | F16K 31/0655 251/129.15 |
| 8,477,002 | B2 * | 7/2013 | Hoppe | F16K 31/0675 335/278 |
| 2005/0092951 | A1 * | 5/2005 | Groetzinger | F16K 1/34 251/129.15 |
| 2008/0203339 | A1 * | 8/2008 | Kato | F16K 31/061 251/65 |
| 2008/0308756 | A1 * | 12/2008 | Yoshimura | F16K 31/0627 251/129.01 |
| 2020/0217894 | A1 * | 7/2020 | Ferrarini | F16K 31/0627 |

* cited by examiner

*Primary Examiner* — Matthew W Jellett
(74) *Attorney, Agent, or Firm* — Birch, Stewart, Kolasch & Birch, LLP

(57) ABSTRACT

A solenoid valve and a manufacturing method are disclosed. The solenoid valve includes a main body portion, a movable iron core, a valve portion, a lower cover and an upper cover. Wherein the main body portion includes a bobbin, a fixed iron core, a magnetic conductive portion, a coil and an outer case. The outer case covers the bobbin, the fixed iron core, the magnetic conductive portion, and the coil. The movable iron core is movable relative to the fixed iron core, and the lower cover is disposed in the valve portion. A left side surface of the upper cover is fixed at the valve portion and the lower cover, and a right side surface of the upper covers is fixed at the main body portion. The solenoid valve has stable size and stable operation, and can quickly cut off the air pressure, and the control effect is good.

6 Claims, 6 Drawing Sheets

SOLENOID VALVE AND MANUFACTURING METHOD FOR THE SAME

BACKGROUND OF THE INVENTION

1. Field of the Invention

The present invention relates to a fluid switching valve and manufacturing for the same, and more particularly to a solenoid valve and manufacturing method for the same.

2. Description of Related Art

When assembling a conventional solenoid valve, additional accessories for assembling are required. Accordingly, the size of the conventional solenoid valve cannot be miniaturized. Besides, since the additional accessories are required, manufacturing tolerances and clearances are existed. For the solenoid valve after being assembled, relative locations among main functional elements will significantly change with different production batches so that the quality is unstable. Besides, protrusions are easily caused at valve orifice that flow through fluid such that the roundness at the valve orifice is poor so that the fluid pressure is leaked or slightly leaked such that the solenoid valve cannot precisely or quickly cut the fluid.

Accordingly, the conventional solenoid valve and manufacturing method for the same are required to be improved.

SUMMARY OF THE INVENTION

The present invention provides a solenoid valve and manufacturing method for the same. The dimension of the solenoid valve could be stayed stable, the performance of the solenoid valve is stable such that the solenoid valve can quickly control and cut the air pressure.

In order to solve the above-mentioned technical problem, a technical solution provided by the present invention is: a solenoid valve comprising: a main body portion, the main body portion includes a bobbin, a fixed iron core, a magnetic conductive portion, a coil and an outer case, wherein the bobbin has a first terminal, a second terminal, a middle portion and a communication hole, the first terminal and the second terminal are disposed oppositely, the middle portion is disposed between the first terminal and the second terminal, the communication hole penetrates through the first terminal, the second terminal and the middle portion such that a center of the bobbin is formed as a receiving space, the fixed iron core is disposed in the communication hole and disposed at the first terminal, the magnetic conductive portion is disposed in the communication hole and disposed at the second terminal, wherein the magnetic conductive portion and the fixed iron core are disposed oppositely; a movable iron core; a valve portion, the valve portion is disposed at a side of the main body portion and connected with the magnetic conductive portion; a lower cove disposed in the valve portion; an upper cover, a left side surface of the upper cover is fixed at the valve portion and the lower cover, and a right side surface of the upper covers is fixed at the main body portion; wherein the outer case of the main body portion surrounds the bobbin, the fixed iron core, the magnetic conductive portion and the coil; and wherein the magnetic conductive portion has an inner hole, the movable iron core is disposed at the inner hole, the communication hole and the valve portion, the movable iron core is capable of moving relatively to the fixed iron core.

Wherein a side surface of the valve portion adjacent to the lower cover has multiple valve protrusions, a left side of the upper cover contacts with the multiple valve protrusions.

Wherein a side surface of the lower cover corresponding to the multiple valve protrusions has multiple cover protrusions, a left side of the upper cover contacts with the multiple valve protrusions.

Wherein the bracket has a horizontal bottom, a first side and a second side, the first side has a through hole, and an end of the fixed iron core is fixed at the through hole, the second side has a clamping portion, the magnetic conductive portion has a first holding ring, the first holding ring is fixed at the clamping portion, and the outer case of the main body portion surrounds the bracket.

Wherein a right side of the upper cover is fixed at a second holding ring. of the magnetic conductive portion.

Wherein the lower cover has a first inner surface and a first valve orifice, the valve portion has a second inner surface and a second valve orifice disposed at the second inner surface, the first valve orifice and the second valve orifice are disposed oppositely.

Wherein the main body portion of the present invention further comprise a main body spring, the valve portion further includes a poppet a poppet guide and a valve spring, the poppet guide stands up the movable iron and jointly moves with the movable iron, the poppet is pressed into at the poppet guide and jointly moves with the connection rod, the main body spring is stood up between the movable iron and the fixed iron, the valve spring is stood up between the poppet and an inner surface of the lower cover.

In order to solve the above-mentioned technical problem, another technical solution provided by the present invention is: a manufacturing method for a solenoid valve, comprising steps of: (a) providing a bobbin, a fixed iron core, a magnetic conductive portion and a coil; (b) fixing the fixed iron core and the magnetic conductive portion at two sides of the bobbin, winding the coil on the bobbin, wherein the magnetic conductive portion has an inner hole, and the bobbin has a communication hole passing through the bobbin; (c) providing a mold, and placing the bobbin, the fixed iron core, the magnetic conductive portion and the coil in the mold, wherein the mold has a thimble, the thimble passes through the inner hole of the magnetic conductive portion and the communication hole of the bobbin, and a front end surface of the thimble stands up against a terminal surface of the fixed iron core; (d) injecting a plastic material into the mold, using an insert molding method for forming an outer case that surrounds the bobbin, the fixed iron core, the magnetic conductive portion and the coil, wherein the bobbin, the fixed iron core, the magnetic conductive portion, the coil and the outer case common forms a main body portion; (e) providing a lower cover and a valve portion, wherein the lower cover has a first inner surface and a first valve orifice the valve portion has a second inner surface and a second valve orifice disposed at the second inner surface, and the first valve orifice and the second valve orifice are disposed oppositely; (f) providing a mold having a thimble, performing a mirror polishing to the thimble, using the thimble to form the first inner surface of the lower cover and the second inner surface of the valve portion; (g) inserting the movable iron core into the main body portion, fixing the lower cover on the valve portion, placing the valve portion at a side of the main body portion, and connecting the magnetic conductive portion; and (h) providing an upper cover, fixing a left side of the upper cover at the valve portion and the lower cover, fixing a right side of the upper cover to the main body portion.

Wherein after the step (b), further comprising steps of: (b1) providing a bracket wherein the bracket has a horizontal bottom, a first side and a second side, the first side has a through hole, the second side has a clamping portion and the magnetic conductive portion has a first holding ring; (b2) fixing an end of the fixed iron core at the through hole, fixing the first holding ring at the clamping portion; and (b3) placing the bracket in the mold, making the plastic material to surround the bracket such that the outer case also surrounds the bracket wherein the bobbin, the fixed iron core, the magnetic conductive portion, the coil, the bracket and the outer case common forms a main body portion.

The beneficial effects of the present invention are: comparing with the prior art, the solenoid valve of present invention mainly includes a main body portion, a movable iron core, a valve portion, a lower cover and an upper cover. Wherein the main body portion includes a bobbin, a fixed iron core, a magnetic conductive portion, a coil and an outer case. The outer case covers the bobbin, the fixed iron core, the magnetic conductive portion, and the coil. The movable iron core is disposed between the main body portion and the valve portion. The movable iron core is movable relative to the fixed iron core, and the lower cover is disposed in the valve portion. A left side surface of the upper cover is fixed at the valve portion and the lower cover, and a right side surface of the upper covers is fixed at the main body portion. Then, the outer case of the main body portion uses an insert molding method for forming and surrounds the bobbin, the fixed iron core, the magnetic conductive portion and the coil. Accordingly, the parts for assembly are saved, and the relative locations are precise and fixed.

Besides, the first inner surface and the second inner surface of the lower cover and the valve portion perform a mirror machining in order to improve the surface roughness so that the inner holes of the first valve orifice and the second valve orifice will not cause protrusions so that the solenoid valve of present invention has the ability for quickly cutting the fluid. Besides, a side surface of the valve portion adjacent to the lower cover has multiple valve protrusions. A side surface of the lower cover corresponding to the multiple valve protrusions has multiple cover protrusions. When the upper cover is installed on and surrounding the valve portion, a left side of the upper cover contacts with the multiple valve protrusions and the multiple cover protrusions. The multiple valve protrusions and the multiple cover protrusions are deformed such that a gap existed between the upper cover, the valve portion and the lower cover is compensated so that the entire solenoid valve is combined tightly. The too large matching tolerance so as to cause loose displacement of the part, no action or action delay can be avoided.

DETAILED DESCRIPTION OF THE PREFERRED EMBODIMENT

The following content combines the figures and the embodiments for detail description of the present invention.

Figure 1:
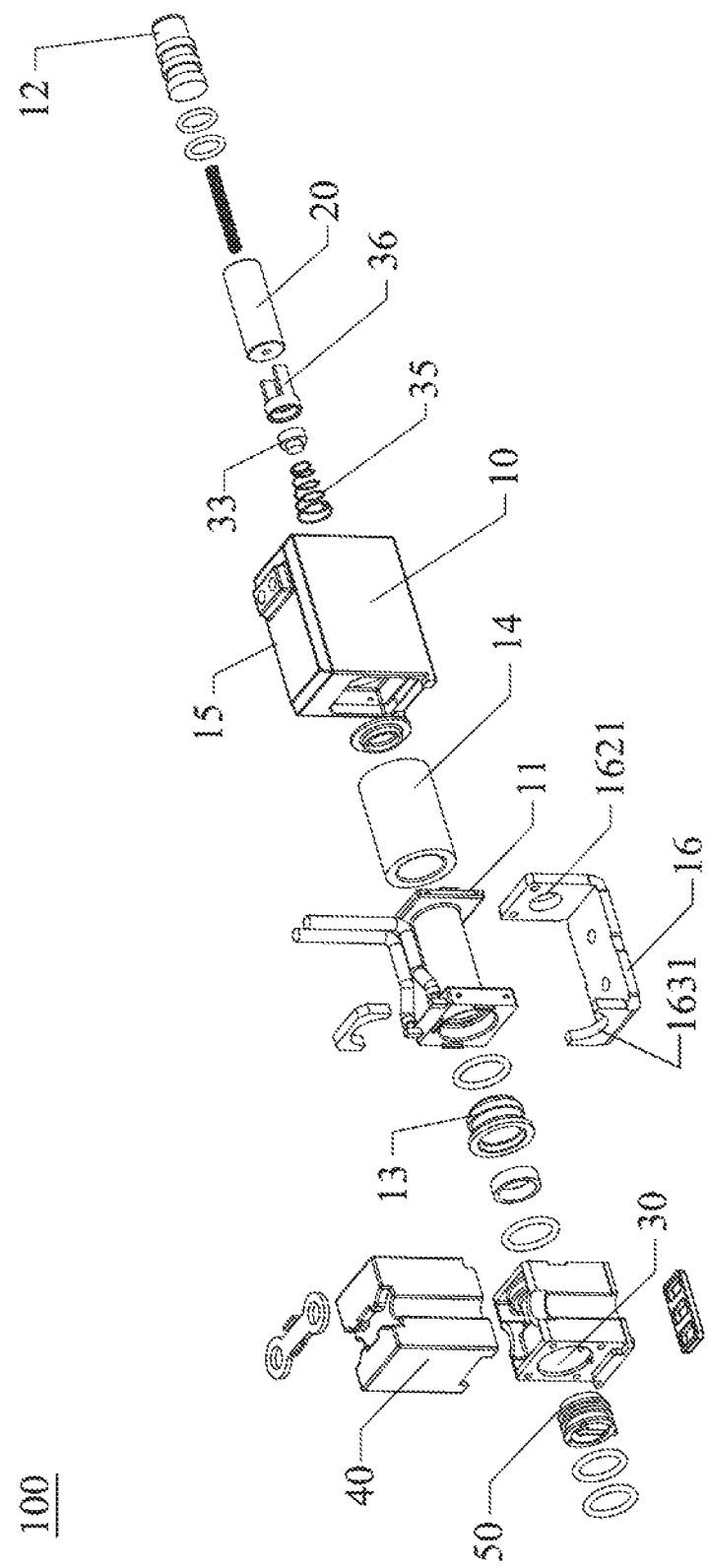
FIG. 1 is an exploded view of the solenoid valve of the present invention.
Figure 2:
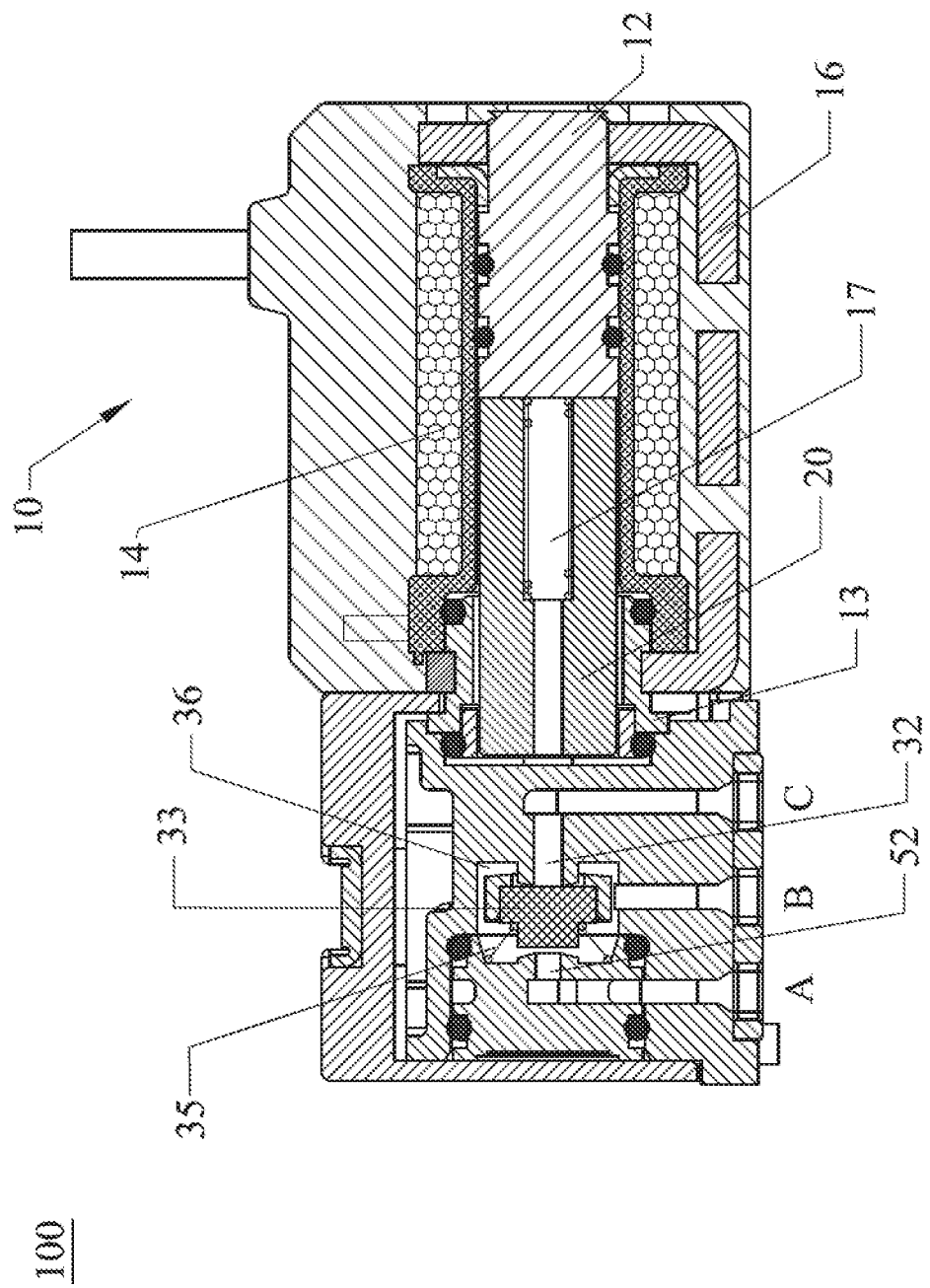
FIG. 2 is a cross-sectional view of the solenoid valve of the present invention.

With reference to FIG. 1 and FIG. 2, the solenoid valve of the present invention includes a main body portion 10, a movable iron core 20, a valve portion 30, an upper cover 40 and a lower cover 50. The main body portion 10 includes a bobbin 11, a fixed iron core 12, a magnetic conductive portion 13, a coil 14 and an outer case 15.

The bobbin 11 has a first terminal 111, a second terminal 112, a middle portion 113 and a communication hole 114. The first terminal 111 and the second terminal 112 are disposed oppositely. The middle portion 113 is disposed between the first terminal 111 and the second terminal 112. The communication hole 114 penetrates through the first terminal 111, the second terminal 112 and the middle portion 113 such that a center of the bobbin 11 forms a receiving space. The fixed iron core 12 is disposed in the communication hole 114 and disposed at the first terminal 111. The fixed iron core 12 is cylindrical and having a groove 121 at an outer surface of the fixed iron core 12. The magnetic conductive portion 13 is disposed in the communication hole 114 and disposed at the second terminal 112. Wherein the magnetic conductive portion 13 and the fixed iron core 12 are disposed oppositely. The coil 14 is wound at the middle portion 113 and located at the first terminal 111 and the second terminal 112.

Figure 3:
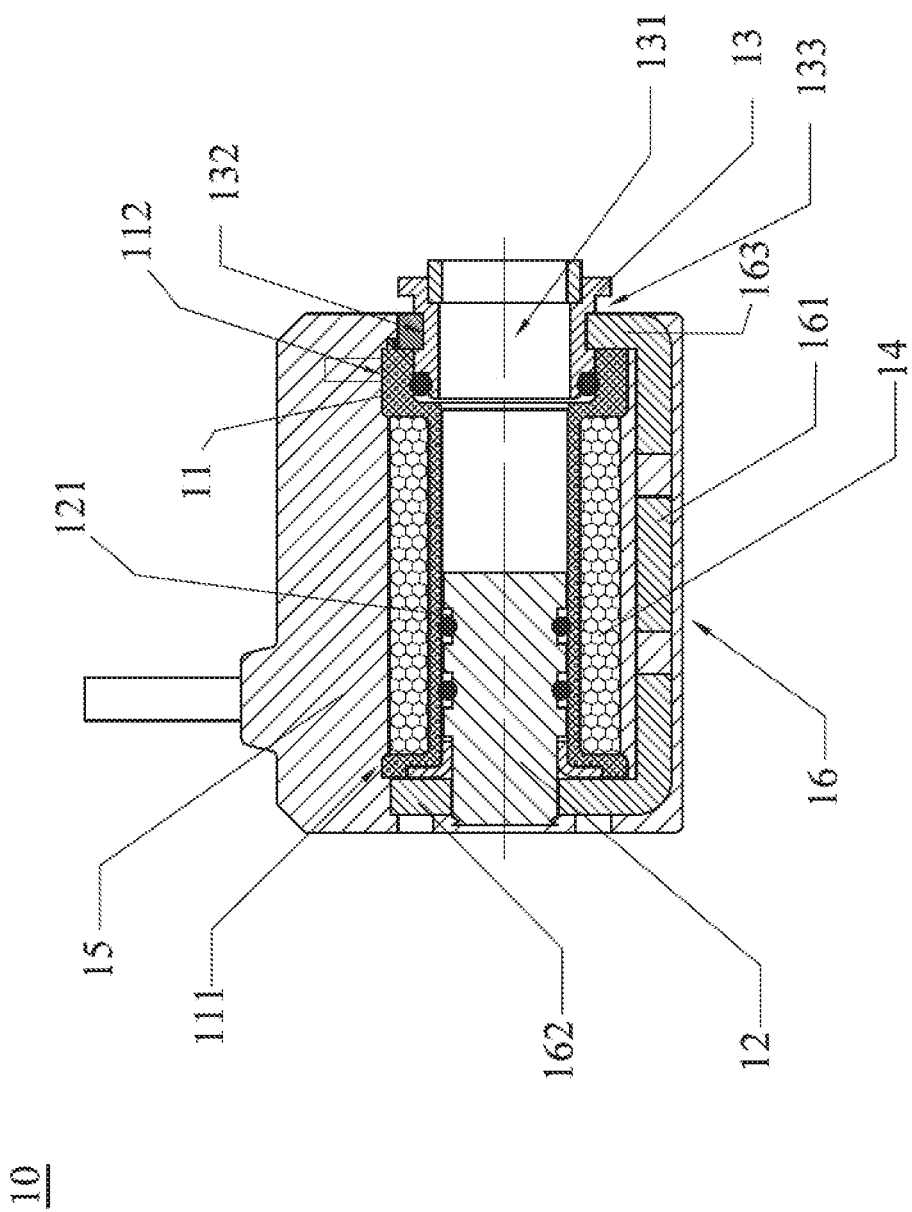
FIG. 3 is a cross-sectional view of a main body portion of the solenoid valve of the present invention.
Figure 4:
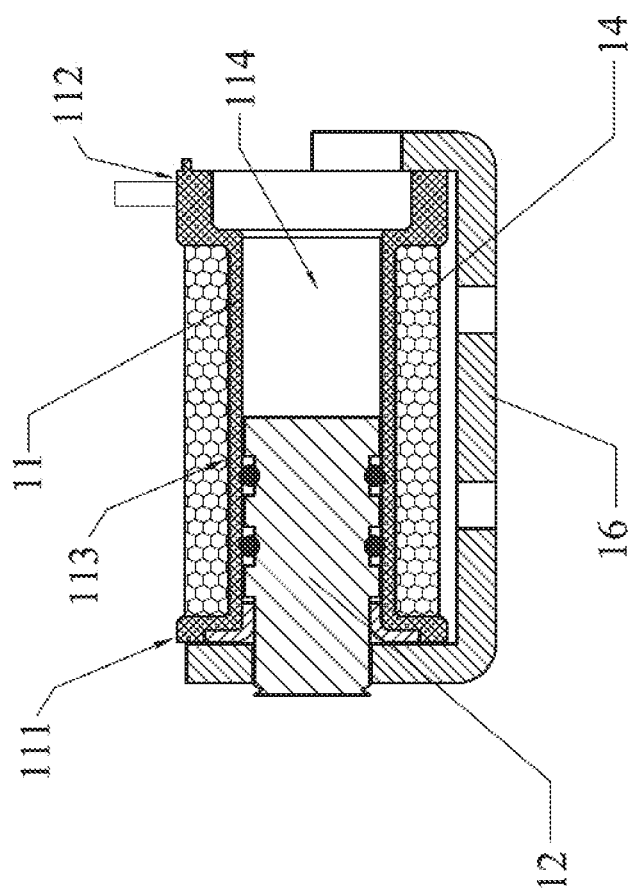
FIG. 4 is a cross-sectional view of a main body portion before being manufactured according to the present invention.

With further reference to FIG. 3 and FIG. 4, when the fixed iron core 12, the magnetic conductive portion 13 and the coil 14 are fixed at the bobbin 11, using a thimble of a mold (not shown in the figure), and making the thimble to pass through an inner hole 131 of the magnetic conductive portion 13 and the communication hole 114 of the bobbin 11, and making a front end surface of the thimble to abut against a terminal surface of the fixed iron core 12. Then, using an insert molding method to inject a plastic material on the mold in order to form the outer case 15. Wherein, the outer case 15 of the main body portion surrounds the bobbin, the fixed iron core, the magnetic conductive portion and the coil.

Through the above method, because the relative position between the fixed iron core 12 and the magnetic conductive portion 13 is fixed firstly through the thimble of the mold, and then, injecting a plastic material for forming. After the plastic material is cured, the fixed iron core 12 and the magnetic conductive portion 13 are fixed at the same time. Accordingly, a conventional assembly part is not required, the relative position between the fixed iron core 12 and the magnetic conductive portion 13 is very stable and precise. Besides, because the relative position between the fixed iron core 12 and the magnetic conductive portion 13 is fixed firstly through the thimble of the mold, after being manufactured, the concentricity and verticality of the fixed iron core 12 and the magnetic conductive portion 13 is good. That is, clearance dimension of solenoid valves 100 produced by different batches are consistent so that the performance of the solenoid valve 100 of the present invention is stable, and the flow control effect is good.

In order to fix the fixed iron core 12 and the magnetic conductive portion 13 more conveniently and increase the magnetic flux of the fixed iron core 12 and the magnetic conductive portion 13, bracket 16 is provided. The bracket 16 has a horizontal bottom 161, a first side 162 and a second side 163. The first side has a through hole 1621, and an end of the fixed iron core 12 is fixed at the through hole 1621. The second side has a clamping portion 1631, the magnetic conductive portion 13 has a first holding ring 132. The first holding ring 132 is fixed at the clamping portion 1631. Accordingly, the bracket 16 can fix a relative location of the fixed iron core 12 and the magnetic conductive portion 13. Wherein, the magnetic conductive portion 13 can increase the magnetic permeability of the solenoid valve 100 so as to decrease the operation voltage. Besides, the fixed iron core 12, the bracket 16, the magnetic conductive portion 13 and the movable iron core 20 form an optimized magnetic loop.

Figure 5:
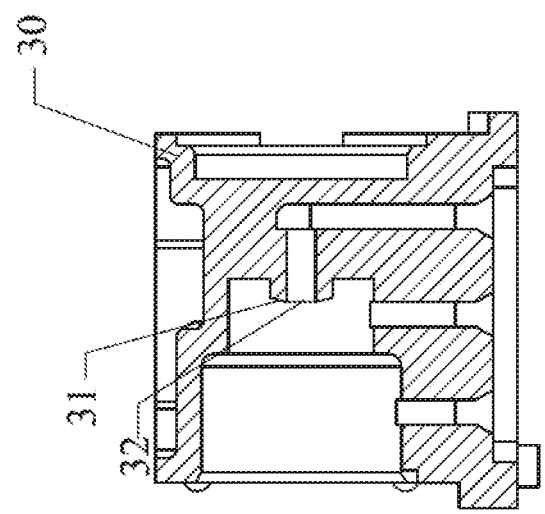
FIG. 5 is a cross-sectional view of a lower cover and a valve portion of the solenoid valve of the present invention.
Figure 5:
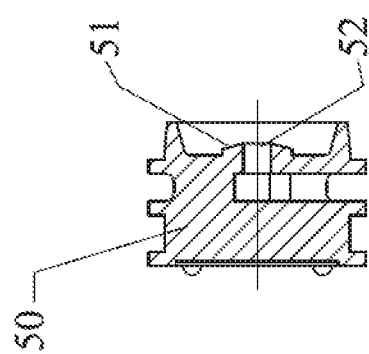

With reference to FIG. 5, in order to increase the ability for cutting the fluid, in another embodiment of the present invention, the lower cover 50 has a first inner surface 51 and a first valve orifice 52. The valve portion 30 has a second inner surface 31 and a second valve orifice 32 disposed at the second inner surface 31. The first valve orifice 52 and the second valve orifice 32 are disposed oppositely. Wherein, the first inner surface 51 and the second inner surface 31 perform a mirror machining to improve the surface roughness. The ways to perform the mirror machining are not limited.

Specifically, in the process of forming the lower cover 50 and the valve portion 30, the thimbles corresponding to the first inner surface 51 and the second inner surface 31 are performed with a mirror polishing. Accordingly, after the first inner surface 51 and the second inner surface 31 are formed, a smooth surface with mirror machining is formed. Accordingly, the surface roughness is low, and inner holes of the first valve orifice 52 and the second valve orifice 32 will not cause protrusions. When a poppet 33 (shown in FIG. 2) is disposed between the first inner surface 51 and the second inner surface 31, and when the-poppet 33 the surface of the poppet 33 can tightly contact with the first inner surface 51 and the second inner surface 31 in order to reach an ability to quickly cut the fluid.

Figure 6:
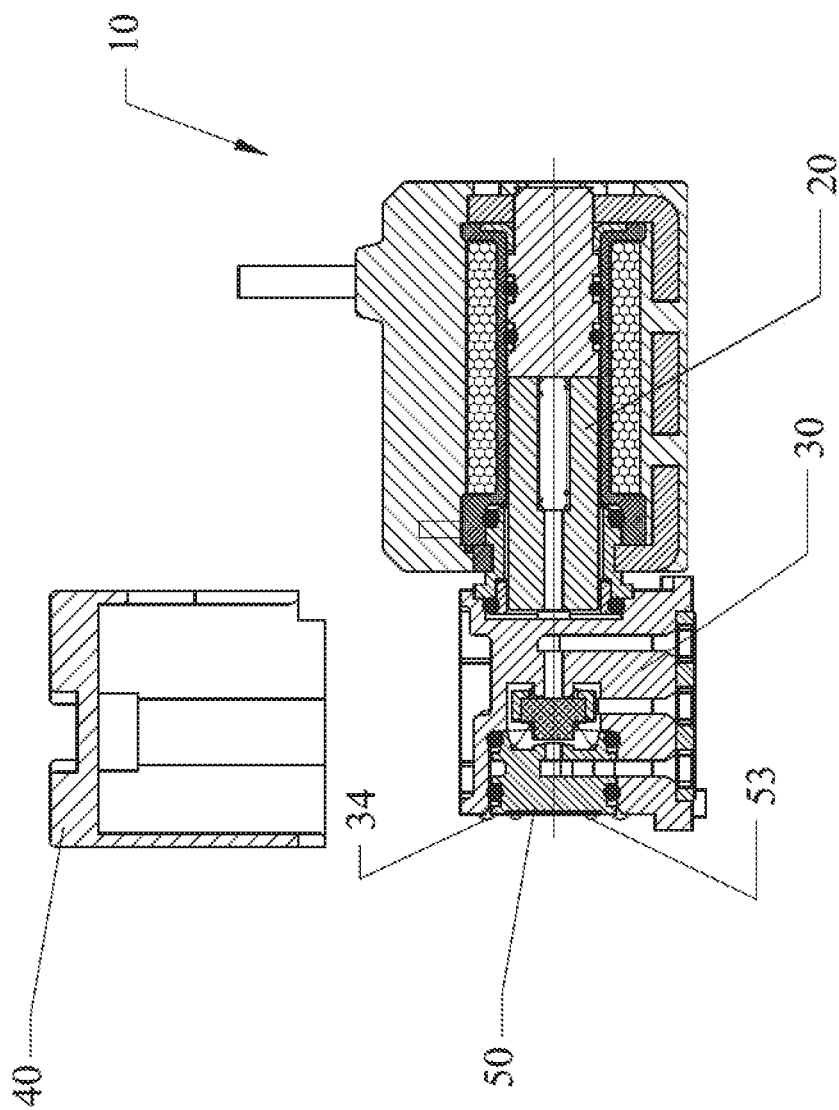
FIG. 6 is a cross-sectional view of the solenoid valve of upper cover before being manufactured according to the present invention.

With reference to FIG. 2 and FIG. 6, the movable iron core 20 is inserted into the main body portion 10 first, then, fixing the lower cover 50 on the valve portion 30, the valve portion 30 is fixed at the main body portion 10. Wherein, the valve portion 30 is disposed at a side of the main body portion 10, and connected with the magnetic conductive portion 13. Then, fixing the upper cover 40 on the valve portion 30 and the main body portion 10. Specifically, a right side of the upper cover 40 is fixed at a second holding ring 133 (shown in FIG. 3). of the magnetic conductive portion 13 Accordingly, the assembly of the solenoid valve 100 of the present invention is completely assembled.

It should be noted that a side surface of the valve portion 30 adjacent to the lower cover 50 has multiple valve protrusions 34. A side surface of the lower cover 50 corresponding to the multiple valve protrusions 34 has multiple cover protrusions 53. When the upper cover is installed on and surrounding the valve portion 30, a left side of the upper cover 40 contacts with the multiple valve protrusions 34 and the multiple cover protrusions 53. The multiple valve protrusions 34 and the multiple cover protrusions 53 are deformed such that a gap existed between the upper cover 40, the valve portion 30 and the lower cover 50 is compensated so that the entire solenoid valve is combined tightly. The too large matching tolerance so as to cause loose displacement of the part, no action or action delay can be avoided.

The operation principle of the present invention is illustrated as following. With reference to FIG. 2, the main body portion 10 of the present invention further comprise a main body spring 17. The valve portion 30 further includes a poppet guide 36 and a valve spring 35. The poppet guide 36 stands up the movable iron 20 and jointly moves with the movable iron 20. The poppet 33 is pressed into the poppet guide 36 and jointly moves with the poppet guide-36. The main body spring 17 is stood up between the movable iron 20 and the fixed iron 12. The valve spring 35 is stood up between the poppet 33 and an inner surface 51 of the lower cover 50. Using a normally closed solenoid valve as an example, when the coil 14 is powered on, the movable iron 20 moves to a right direction to be sucked with the fixed iron 12, the valve spring 35 push the poppet 33 and the poppet guide 36 in order to seal the second valve orifice 32. A fluid (such as a gas (pneumatic)) enters the valve portion 30 from a first valve opening A, and exhausts from the second valve opening B. On the contrary, when the coil 14 is powered off, the main body spring 17 stands up the movable iron 20 to push the poppet guide 36 so that the position of the poppet-33 is reset to seal the first valve orifice 52. Accordingly, the fluid (such as a gas(pneumatic)) can enter the valve portion 30 from the second valve opening B, and exhausts from the third valve opening C. Using a normally open type solenoid valve as an example, the coil 14 is powered off first, at this time, the poppet seals the first valve orifice 52, the fluid (such as a gas(pneumatic)) enters the valve portion from the third valve opening C, and exhausts from the second valve opening B. On the contrary, when the coil 14 is powered on, the second valve orifice 32 is sealed, the fluid enters the valve portion from the second valve opening B, and exhausts from the first valve opening A.

In summary, the solenoid valve of present invention mainly includes a main body portion, a movable iron core, a valve portion, a lower cover and an upper cover. Wherein the main body portion includes a bobbin, a fixed iron core, a magnetic conductive portion, a coil and an outer case. The outer case covers the bobbin, the fixed iron core, the magnetic conductive portion, and the coil. The movable iron core is disposed between the main body portion and the valve portion. The movable iron core is movable relative to the fixed iron core, and the lower cover is disposed in the valve portion. A left side surface of the upper cover is fixed at the valve portion and the lower cover, and a right side surface of the upper covers is fixed at the main body portion. Then, the outer case of the main body portion uses an insert molding method for forming and surrounds the bobbin, the fixed iron core, the magnetic conductive portion and the coil. Accordingly, the parts for assembly are saved, and the relative locations are precise and fixed.

Besides, the first inner surface and the second inner surface of the lower cover and the valve portion perform a mirror machining in order to improve the surface roughness so that the inner holes of the first valve orifice and the second valve orifice will not cause protrusions so that the solenoid valve of present invention has the ability for quickly cutting the fluid. Besides, a side surface of the valve portion adjacent to the lower cover has multiple valve protrusions. A side surface of the lower cover corresponding to the multiple valve protrusions has multiple cover protrusions. When the upper cover is installed on and surrounding the valve portion, a left side of the upper cover contacts with the multiple valve protrusions and the multiple cover protrusions. The multiple valve protrusions and the multiple cover protrusions are deformed such that a gap existed between the upper cover, the valve portion and the lower cover is compensated so that the entire solenoid valve is combined tightly. The too large matching tolerance so as to cause loose displacement of the part, no action or action delay can be avoided.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. A solenoid valve comprising:
   a main body portion, the main body portion includes a bobbin, a fixed iron core, a magnetic conductive portion, a coil and an outer case, wherein the bobbin has a first terminal, a second terminal, a middle portion and a communication hole, the first terminal and the second terminal are disposed oppositely, the middle portion is disposed between the first terminal and the second terminal, the communication hole penetrates through the first terminal, the second terminal and the middle portion such that a center of the bobbin forms a receiving space, the fixed iron core is disposed in the communication hole and disposed at the first terminal, the magnetic conductive portion is disposed in the communication hole and disposed at the second terminal, wherein the magnetic conductive portion and the fixed iron core are disposed oppositely;
   a movable iron core;
   a valve portion, the valve portion is disposed at a side of the main body portion and connected with the magnetic conductive portion;
   a lower cover disposed in the valve portion;
   an upper cover, a left side surface of the upper cover is fixed at the valve portion and the lower cover, and a right side surface of the upper cover is fixed at the main body portion;
   wherein the outer case of the main body portion surrounds the bobbin, the fixed iron core, the magnetic conductive portion and the coil,
   wherein the magnetic conductive portion has an inner hole, the movable iron core is disposed at the inner hole, the communication hole and the valve portion, the movable iron core is capable of moving relatively to the fixed iron core,
   wherein a side surface of the valve portion adjacent to the lower cover has multiple valve protrusions, a left side of the upper cover contacts with the multiple valve protrusions,
   wherein a side surface of the lower cover corresponding to the multiple valve protrusions has multiple cover protrusions, a left side of the upper cover contacts with the multiple valve protrusions, and
   wherein a right side of the upper cover is fixed at a second holding ring of the magnetic conductive portion.

2. The solenoid valve according to claim 1, further comprising a bracket, wherein the bracket has a horizontal bottom, a first side and a second side, the first side has a through hole, and an end of the fixed iron core is fixed at the through hole, the second side has a clamping portion, the magnetic conductive portion has a first holding ring, the first holding ring is fixed at the clamping portion, and the outer case of the main body portion surrounds the bracket.

3. The solenoid valve according to claim 1, wherein the lower cover has a first inner surface and a first valve orifice, the valve portion has a second inner surface and a second valve orifice disposed at the second inner surface, the first valve orifice and the second valve orifice are disposed oppositely.

4. The solenoid valve according to claim 3, wherein the main body portion further comprise further comprises a main body spring, the valve portion further includes a poppet a poppet guide and a valve spring, the poppet guide stands up the movable iron core and jointly moves with the movable iron core, the poppet is pressed into the poppet guide and jointly moves with a connection rod, the main body spring is stood up between the movable iron core and the fixed iron core, the valve spring is stood up between the poppet and an inner surface of the lower cover.

5. A manufacturing method for a solenoid valve, comprising steps of:
   (a) providing a bobbin, a fixed iron core, a magnetic conductive portion and a coil;
   (b) disposing the fixed iron core at a first side of the bobbin and the magnetic conductive portion at a second side of the bobbin that is opposite to the first side of the bobbin, and winding the coil on the bobbin, wherein the magnetic conductive portion has an inner hole, and the bobbin has a communication hole passing through the bobbin;
   (c) providing a mold, and placing the bobbin, the fixed iron core, the magnetic conductive portion and the coil in the mold, wherein the mold has a thimble, the thimble passes through the inner hole of the magnetic conductive portion and the communication hole of the bobbin, and a front end surface of the thimble stands up against a terminal surface of the fixed iron core;
   (d) injecting a plastic material into the mold, using an insert molding method for forming an outer case that surrounds the bobbin, the fixed iron core, the magnetic conductive portion and the coil, wherein the bobbin, the fixed iron core, the magnetic conductive portion, the coil and the outer case common forms a main body portion;
   (e) providing a lower cover and a valve portion, wherein the lower cover has a first inner surface and a first valve orifice the valve portion has a second inner surface and a second valve orifice disposed at the second inner surface, and the first valve orifice and the second valve orifice are disposed oppositely;
   (f) providing a mold having a thimble, performing a mirror polishing to the thimble, using the thimble to form the first inner surface of the lower cover and the second inner surface of the valve portion;
   (g) inserting the movable iron core into the main body portion, fixing the lower cover on the valve portion, placing the valve portion at a side of the main body portion, and connecting the magnetic conductive portion; and
   (h) providing an upper cover, fixing a left side of the upper cover at the valve portion and the lower cover, fixing a right side of the upper cover to the main body portion.

6. The manufacturing method for a solenoid valve according to claim 5, wherein after the step (b), further comprising steps of:
   (b1) providing a bracket, wherein the bracket has a horizontal bottom, a first side and a second side, the first side has a through hole, the second side has a clamping portion and the magnetic conductive portion has a first holding ring;
   (b2) fixing an end of the fixed iron core at the through hole, fixing the first holding ring at the clamping portion; and (b3) placing the bracket in the mold, making the plastic material to surround the bracket such that the outer case also surrounds the bracket, wherein the bobbin, the fixed iron core, the magnetic conductive portion, the coil, the bracket and the outer case common forms a main body portion.

\* \* \* \* \*